(12) United States Patent
Song et al.

(10) Patent No.: US 9,946,010 B2
(45) Date of Patent: Apr. 17, 2018

(54) DISPLAY DEVICE

(71) Applicant: SAMSUNG DISPLAY CO., LTD., Yongin-si (KR)

(72) Inventors: Heekwang Song, Suwon-si (KR); Yonghoon Kwon, Hwaseong-si (KR); Junghyun Kim, Seoul (KR); Seokhyun Nam, Seoul (KR); Hosik Shin, Gunpo-si (KR); Juyoung Yoon, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 34 days.

(21) Appl. No.: 15/049,580

(22) Filed: Feb. 22, 2016

(65) Prior Publication Data

US 2016/0349429 A1 Dec. 1, 2016

(30) Foreign Application Priority Data

May 29, 2015 (KR) ........................ 10-2015-0076039

(51) Int. Cl.
*F21V 7/04* (2006.01)
*F21V 8/00* (2006.01)
*G09G 3/34* (2006.01)
*G02F 1/1335* (2006.01)

(52) U.S. Cl.
CPC ........... *G02B 6/005* (2013.01); *G02B 6/0051* (2013.01); *G02B 6/0068* (2013.01); *G02F 1/133514* (2013.01); *G02F 1/133621* (2013.01); *G09G 3/3413* (2013.01); *G09G 3/3426* (2013.01); *G02F 1/133603* (2013.01); *G09G 2320/0242* (2013.01)

(58) Field of Classification Search
USPC .................................................. 362/613, 606
See application file for complete search history.

(56) References Cited

U.S. PATENT DOCUMENTS

| 2007/0146509 A1* | 6/2007 | Hekstra | G09G 3/3413 |
| | | | 348/253 |
| 2008/0224986 A1* | 9/2008 | Huang | G09G 3/3413 |
| | | | 345/102 |

(Continued)

FOREIGN PATENT DOCUMENTS

| KR | 1020120002782 | 1/2012 |
| KR | 1020130126396 | 11/2013 |
| KR | 1020140113046 | 9/2014 |

*Primary Examiner* — Tuyen K Vo
(74) *Attorney, Agent, or Firm* — Cantor Colburn LLP

(57) ABSTRACT

A display device includes a display panel including a first pixel, a second pixel, a third pixel, and a fourth pixel, and a backlight unit including a first light source emitting a first light and a second light source emitting a second light, the first, second, third, and fourth pixels including respective light control layers and including respective light converting units, the light converting units respectively receiving the first light from the backlight unit through the light control layers of the first, second, and third pixels and converting the received first light into light having different wavelengths, the fourth pixel including a light transmitting unit receiving the second light from the backlight unit through the light control layer of the fourth pixel and transmitting the received second light therethrough.

18 Claims, 8 Drawing Sheets

(56) References Cited

U.S. PATENT DOCUMENTS

| | | | |
|---|---|---|---|
| 2008/0273005 A1* | 11/2008 | Chen | G09G 3/3413 345/102 |
| 2009/0140980 A1* | 6/2009 | Morimoto | G06F 3/0325 345/158 |
| 2010/0079366 A1* | 4/2010 | Lin | G09G 3/3413 345/102 |
| 2010/0165221 A1* | 7/2010 | Krijn | G02B 27/2214 349/15 |
| 2011/0249038 A1* | 10/2011 | Yamazaki | G09G 3/3413 345/690 |
| 2012/0050352 A1* | 3/2012 | Baba | G09G 3/3413 345/691 |
| 2012/0120128 A1* | 5/2012 | Oh | H04N 13/0438 345/691 |
| 2013/0010229 A1* | 1/2013 | Shin | G02F 1/133617 349/62 |
| 2013/0300771 A1 | 11/2013 | Cho et al. | |
| 2014/0268633 A1 | 9/2014 | Kwon et al. | |
| 2014/0369072 A1* | 12/2014 | Liao | G02B 6/0068 362/613 |

* cited by examiner

DISPLAY DEVICE

This application claims priority to Korean Patent Application No. 10-2015-0076039, filed on May 29, 2015, and all the benefits accruing therefrom under 35 U.S.C. § 119, the content of which in its entirety is herein incorporated by reference.

BACKGROUND

1. Field

Exemplary embodiments of the invention relate to a display device, and more particularly, to a display device excellent in color reproducibility due to an expanded color gamut.

2. Description of the Related Art

In this highly information-dependent modern society, the significance of display devices as a visual information transfer medium is widely acknowledged. Accordingly, key features required for display devices may include low-power consumption, slimness, lightweight, high-definition, and the like.

Such display devices are classified into self-emission-type display devices in which display panels emit light, such as cathode ray tubes ("CRT"), electroluminescent ("EL") display devices, light emitting diode ("LED") display devices, vacuum fluorescent display ("VFD") devices, field emission display ("FED") devices, and plasma display panel ("PDP") devices, and non-emission-type display devices in which display panels do not emit light by themselves, such as liquid crystal display ("LCD") devices.

In general, an LCD device includes an LCD panel which is configured to display an image using the light transmittance of liquid crystals, and a light source module providing light to the LCD panel. The light source module may be a backlight unit, for example.

The light source module includes light sources that generate light to display an image on the LCD panel. The light sources may include a cold cathode fluorescent lamp ("CCFL"), a flat fluorescent lamp ("FFL"), and an LED, for example.

An LCD device generally uses color filters having three different colors of red (R), green (G) and blue (B) in conjunction with a mono-color light source. Thus, the reproduction of various colors may be difficult in LCD devices. To enhance color reproducibility in this regard, a scheme of expanding a cyan color gamut has been researched. The scheme includes dimming a light source based on a color gamut of an image, using an additional cyan color light source, along with a conventional light source.

SUMMARY

When a light source having a cyan color is driven, a low cyan color ratio in an image may result. That is, the color purity of a pixel that does not correspond to a cyan color gamut may decrease. When the light source having a cyan color is not driven, the cyan color gamut may not be expanded.

As a result, using such an additional light source having a cyan color, color reproducibility may increase in a case of a high cyan color ratio in an image whereas the color purity or color reproducibility of each pixel may decrease in a case of a low cyan color ratio in an image.

In addition, the ultra-high-definition ("UHD") broadcast color standard has an expanded color gamut, as compared to a color gamut of the conventional high-definition ("HD") broadcast color standard. Accordingly, there is a need for a scheme of expanding a color gamut that is representable by a display device.

Thus, there is a need for research on an liquid crystal display ("LCD") device that provides excellent color reproducibility, image quality and color purity.

Exemplary embodiments of the invention are directed to a display device having high color reproducibility due to an expanded color gamut and having excellent image quality with enhanced color purity.

According to an exemplary embodiment of the invention, a display device includes a display panel including a first pixel, a second pixel, a third pixel, and a fourth pixel, and a backlight unit including a first light source emitting a first light and a second light source emitting a second light, wherein the first, second, third, and fourth pixels include respective light control layers, wherein the first, second, and third pixels include respective light converting units, the light converting units respectively receiving the first light from the backlight unit through the light control layers of the first, second, and third pixels and converting the received first light into light having different wavelengths, and wherein the fourth pixel includes a light transmitting unit receiving the second light from the backlight unit through the light control layer of the fourth pixel and transmitting the received second light therethrough.

In an exemplary embodiment, the backlight unit may emit at least one of the first light and the second light for each predetermined time period.

In a first time period, the backlight unit may emit the first light, the light control layers of the first, second and third pixels may transmit the first light to provide the first light to the light converting units, respectively, and the light control layer of the fourth pixel may block the first light, and in a second time period, the backlight unit may emit the second light, the light control layer of the fourth pixel may transmit the second light to provide the second light to the light transmitting unit, and the light control layers of the first, second and third pixels may block the second light.

In an exemplary embodiment, the first light source may be turned on and the second light source may be turned off in the first time period, and the second light source may be turned on and the first light source may be turned off in the second time period.

In an exemplary embodiment, the light converting unit may include a first color filter on the first pixel, the first color filter transmitting light having a wavelength in a range of about 625 nanometers (nm) to about 740 nm, a second color filter on the second pixel, the second color filter transmitting light having a wavelength in a range of about 500 nm to about 565 nm, and a third color filter on the third pixel, the third color filter transmitting light having a wavelength in a range of about 440 nm to about 485 nm.

In an exemplary embodiment, the backlight unit may be disposed below the display panel and may include a diffusion plate.

In an exemplary embodiment, the backlight unit may include the first and second light sources on a side surface of the display panel and may further include a light guide plate below the display panel.

In an exemplary embodiment, the backlight unit may emit a first light having a white color.

In an exemplary embodiment, the first light may have a peak wavelength in a range of about 440 nm to about 485 nm.

In an exemplary embodiment, the backlight unit may emit a second light having a cyan color.

In an exemplary embodiment, the second light may have a peak wavelength in a range of about 485 nm to about 500 nm.

In an exemplary embodiment, the backlight unit may emit a second light having a yellow color.

In an exemplary embodiment, the second light may have a peak wavelength in a range of about 565 nm to about 590 nm.

In an exemplary embodiment, the light transmitting unit may include a transparent photoresist.

The foregoing is illustrative only and is not intended to be in any way limiting. In addition to the illustrative exemplary embodiments, and features described above, further exemplary embodiments, and features will become apparent by reference to the drawings and the following detailed description.

BRIEF DESCRIPTION OF THE DRAWINGS

The above and other features and exemplary embodiments of the invention of invention will be more clearly understood from the following detailed description taken in conjunction with the accompanying drawings, in which.

DETAILED DESCRIPTION

Figure 1:
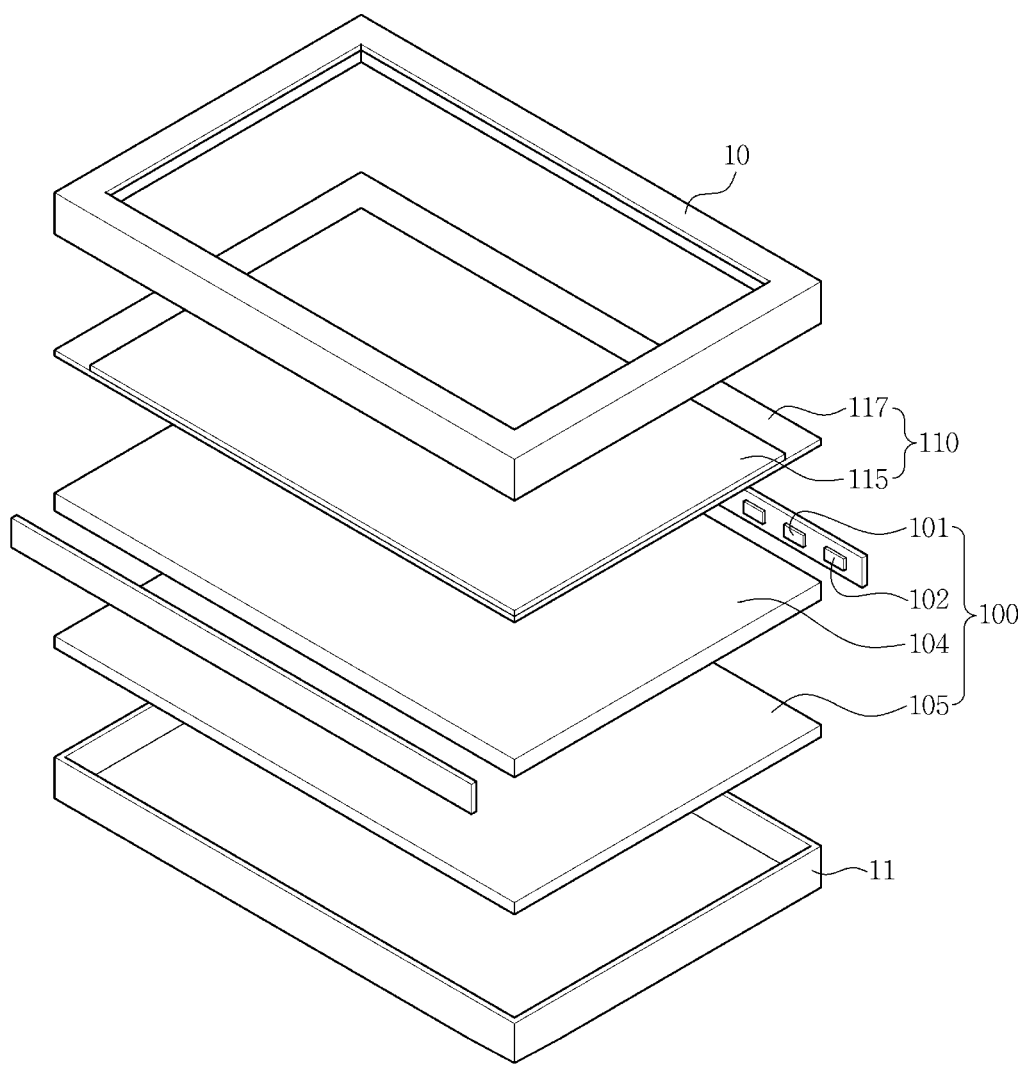
FIG. 1 is a perspective view illustrating an exemplary embodiment of an edge-type liquid crystal display ("LCD") device according to the invention.

Advantages and features of the invention and methods for achieving them will be made clear from exemplary embodiments described below in detail with reference to the accompanying drawings. The invention may, however, be embodied in many different forms and should not be construed as being limited to the exemplary embodiments set forth herein. Rather, these exemplary embodiments are provided so that this disclosure will be thorough and complete, and will fully convey the scope of the invention to those skilled in the art. The invention is merely defined by the scope of the claims. Therefore, well-known constituent elements, operations and techniques are not described in detail in the exemplary embodiments in order to prevent the invention from being obscurely interpreted. Like reference numerals refer to like elements throughout the specification.

The spatially relative terms "below", "beneath", "lower", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, exemplary embodiments with respect to a display device will be described with reference to FIGS. 1 through 8. Terms of components used in the specification are selected for ease of description, and thus, may differ from actual product names.

FIG. 1 is a perspective view illustrating a liquid crystal display ("LCD") device according to an exemplary embodiment.

Figure 2:
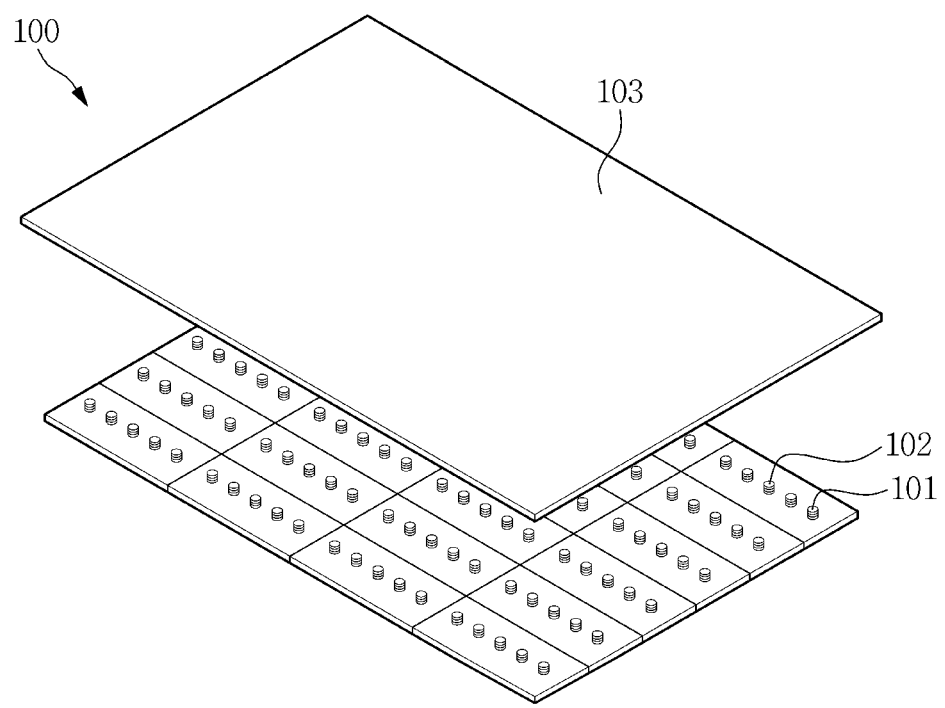
FIG. 2 is a perspective view illustrating another exemplary embodiment of a direct-type backlight unit according to the invention.

FIG. 2 is a perspective view illustrating a backlight unit 100 of an LCD device according to another exemplary embodiment.

Referring to FIG. 1, the display device according to the exemplary embodiment includes a backlight unit 100 and a display panel 110.

In this instance, the backlight unit 100 and the display panel 110 are assembled into a stacked structure, thereby forming the display device. The display device may further include an upper case 10 and a lower case 11 for protecting and fixing the backlight unit 100.

In an exemplary embodiment, the upper case 10 may be coupled to the lower case 11 through a coupling member such as hook coupling and/or screw coupling. However, the invention is not limited thereto, the coupling of the upper case 10 and the lower case 11 may be modified in various manners. In another exemplary embodiment, the upper case 10 may be omitted based on the type of display device.

The lower case 11 is configured to accommodate a diffusion plate 103 and a light guide plate 104. In an exemplary embodiment, the lower case 11 may include, for example, metal materials having rigidity, such as stainless steel, or materials having excellent heat dissipation properties, such as aluminum (Al) or an Al alloy. The lower case 11 maintains a framework of the display device and protects various components accommodated in the display device.

The backlight unit 100 includes a first light source 101 emitting a first light, a second light source 102 emitting a second light, and a circuit board on which the light sources are disposed. The backlight unit 100 includes the light guide plate 104. As the backlight unit 100 illustrated in FIG. 1 is an edge-type backlight unit, the first light source 101 and the second light source 102 may be disposed on an edge or a light incident side surface of the light guide plate 104. In other words, the first light source 101 and the second light source 102 may emit light toward the edge or the light incident side surface of the light guide plate 104. However, the invention is not limited thereto, and the backlight unit 100 may include various other types of backlight units.

In an exemplary embodiment, the first light source 101 and the second light source 102 may include at least a light emitting diode ("LED") chip (not illustrated) and a package (not illustrated) accommodating the LED chip. In an exemplary embodiment, the package accommodating the LED chip may include a material for converting into light having a specific wavelength, such as a phosphor, a quantum dot, and a quantum rod. Each of the first light source 101 and the second light source 102 may have a light emitting surface toward the light guide plate 104. However, the invention is not limited thereto, and various other types of light sources may be included.

In an exemplary embodiment, the circuit board (not illustrated) may include, for example, a printed circuit board ("PCB") or a metal printed circuit board ("MPCB"). However, the invention is not limited thereto, and various other types of circuit boards may be included.

The first light source 101 and the second light source 102 may be provided on one side surface, two or four side surfaces of the light guide plate 104 while being spaced apart from one another at predetermined intervals, based on a size, luminance uniformity, and the like, of the display panel 110. According to exemplary embodiments, the first light source 101 and the second light source 102 may be disposed on at least one of the edges of the light guide plate 104.

The light guide plate 104 receives light emitted from the first light source 101 and the second light source 102 on the light incident side surface of the light guide plate 104, and outputs the light toward a light dissipating surface of the light guide plate 104. The light guide plate 104 is configured to uniformly supply, to the display panel 110, the light supplied from the first light source 101 and the second light source 102. The light guide plate 104 is disposed adjacent to the first light source 101 and the second light source 102 and is accommodated in the lower case 11. In an exemplary embodiment, the light guide plate 104 may be provided, for example, in a quadrangular planar shape, for example, similarly to the display panel 110, but the shape of the light guide plate 104 is not limited thereto. According to exemplary embodiments, in a case of using an LED as the first light source 101 and the second light source 102, the light guide plate 104 may have various shapes such as a predetermined groove and/or a protrusion, based on a position of the first light source 101 and the second light source 102.

The light guide plate 104 is described herein as having a planar shape, that is, a plate, for ease of description. According to exemplary embodiments, the light guide plate 104 may be provided in a sheet or film shape to achieve slimness of the display device. In an exemplary embodiment, the light guide plate 104 may include not only a plate but also a film for guiding light.

The light guide plate 104 may include a light-transmissive material. In an exemplary embodiment, the light-transmissive material may include polycarbonate ("PC"), or an acrylic resin such as polymethyl methacrylate ("PMMA") to help guide light efficiently.

A pattern may be defined on at least a surface of the light guide plate 104. In an exemplary embodiment, a scattering pattern (not illustrated) may allow light guided to a lower surface of the light guide plate 104 to be emitted upwardly thereof, for example.

The backlight unit 100 may further include an optical sheet (not illustrated) and a reflective sheet 105.

The optical sheet (not illustrated) is disposed on the light guide plate 104 and serves to diffuse and/or collimate light transmitted from the light guide plate 104. In an exemplary embodiment, the optical sheet may include a diffusion sheet, a prism sheet, a protective sheet, and the like.

The diffusion sheet may serve to prevent partial concentration of light by dispersing light incident thereon from the light guide plate 104.

In an exemplary embodiment, the prism sheet may include, on a surface thereof, prisms having a triangular cross-section, for example, and provided in a predetermined array. The prism sheet may be disposed on the diffusion sheet to collimate light diffused from the diffusion sheet in a direction perpendicular to the display panel 110.

The protective sheet may be disposed on the prism sheet, may protect a surface of the prism sheet, and may diffuse light in order to achieve uniform light distribution.

The reflective sheet 105 is disposed between the light guide plate 104 and the lower case 11, and reflects a light emitted downwardly of the light guide plate 104 to allow the light to be directed toward the display panel 110, thereby improving light efficiency.

The reflective sheet 105 may include, for example, polyethylene terephthalate ("PET"), thus having reflectivity. In an exemplary embodiment, a surface of the reflective sheet 105 may be coated with a diffusion layer including, for example, titanium dioxide ($TiO_2$).

According to exemplary embodiments, the reflective sheet 105 may include a material including a metal, such as silver (Ag).

Referring to FIG. 2, the backlight unit 100 according to the another exemplary embodiment is a direct-type backlight unit, and includes a first light source 101 emitting a first light, a second light source 102 emitting a second light, and a circuit board (not illustrated) on which the light sources are disposed. The backlight unit 100 may include a diffusion plate 103. The first light source 101 and the second light source 102 may be disposed below the diffusion plate 103. In other words, the first light source 101 and the second light source 102 may emit light in a direction perpendicular to the diffusion plate 103.

The backlight unit 100 may further include an optical sheet (not illustrated) and a reflective sheet (not illustrated).

The first light source 101 and the second light source 102 may include at least an LED chip (not illustrated) and a package (not illustrated) accommodating the LED chip. In an exemplary embodiment, the package accommodating the LED chip may include a material for converting into light having a specific wavelength, such as a phosphor, a quantum dot, and a quantum rod. Each of the first light source 101 and the second light source 102 may have a light emitting surface in a direction perpendicular to the diffusion plate 103.

In an exemplary embodiment, the circuit board (not illustrated) may include, for example, a printed circuit board ("PCB") or a metal printed circuit board ("MPCB").

The first light source 101 and the second light source 102 may be disposed below the diffusion plate 103 while being spaced apart from one another at predetermined intervals based on a size, luminance uniformity, and the like, of the display panel 110.

The diffusion plate 103 is configured to uniformly supply, to the display panel 110, the light supplied from the first light source 101 and the second light source 102. The diffusion plate 103 is disposed on the first light source 101 and the second light source 102 and is accommodated in the lower case 11. In an exemplary embodiment, the diffusion plate 103 may be provided, for example, in a quadrangular planar shape, similarly to the display panel 110, but the shape of the diffusion plate 103 is not limited thereto. According to exemplary embodiments, in a case of using an LED as the first light source 101 and the second light source 102, the diffusion plate 103 may have various shapes, such as a predetermined groove and/or a protrusion, based on a position of the first light source 101 and the second light source 102.

The diffusion plate 103 is described herein as having a planar shape, that is, a plate, for ease of description. According to exemplary embodiments, the diffusion plate 103 may be provided in a sheet or film shape to achieve slimness of the display device. In an exemplary embodiment, the diffusion plate 103 may include not only a plate but also a film for dispersing light.

In an exemplary embodiment, the diffusion plate 103 may include a material, for example, polycarbonate ("PC"), or an acrylic resin such as polymethyl methacrylate ("PMMA").

The optical sheet (not illustrated) is disposed on the diffusion plate 103 and serves to diffuse and/or collimate light transmitted from the diffusion plate 103. The optical sheet may include a diffusion sheet, a prism sheet, a protective sheet, and the like.

The diffusion sheet may serve to prevent partial concentration of light by dispersing light incident thereon from the diffusion plate 103.

The prism sheet may include, on a surface thereof, prisms having a triangular cross-section and provided in a predetermined array. The prism sheet may be disposed on the diffusion sheet to collimate light diffused from the diffusion sheet in a direction perpendicular to the display panel 110.

The protective sheet may be disposed on the prism sheet, may protect a surface of the prism sheet, and may diffuse light in order to achieve uniform light distribution.

The reflective sheet 105 is disposed between the diffusion plate 103 and the lower case 11, and reflects a light emitted downwardly of the diffusion plate 103 to allow the light to be directed toward the display panel 110, thereby improving light efficiency.

In an exemplary embodiment, the reflective sheet 105 may include, for example, polyethylene terephthalate ("PET"), thus having reflectivity. In an exemplary embodiment, a surface of the reflective sheet 105 may be coated with a diffusion layer including, for example, titanium dioxide ($TiO_2$).

According to exemplary embodiments, the reflective sheet 105 may include a material including a metal, such as silver (Ag).

The display panel 110 is configured to display images. In an exemplary embodiment, the display panel 110 that is a light-receiving type (or non-emissive-type) display panel may include an LCD panel, an electrowetting display panel, an electrophoretic display ("EPD") panel, or a microelectromechanical system ("MEMS") display panel, for example. However, the invention is not limited thereto, and the display panel 110 may include various other types of display panels.

In an exemplary embodiment, the display panel 110 may be provided in a quadrangular planar shape having two pairs of parallel sides, for example. In an exemplary embodiment, the display panel 110 may have a rectangular shape having a pair of relatively long sides and a pair of relatively short sides, for example.

The display panel 110 includes a driving chip (not illustrated) configured to supply a driving signal, a driving-chip mounting film (not illustrated) on which the driving chip is mounted, and a PCB (not illustrated) electrically connected to the display panel 110 through the driving-chip mounting film. In an exemplary embodiment, the driving-chip mounting film may be a tape carrier package ("TCP"), for example.

The driving chip generates a driving signal for driving the display panel 110 in response to an external signal. The external signal is supplied from the PCB and may include an image signal, various control signals, a driving voltage, and the like.

Figure 3:
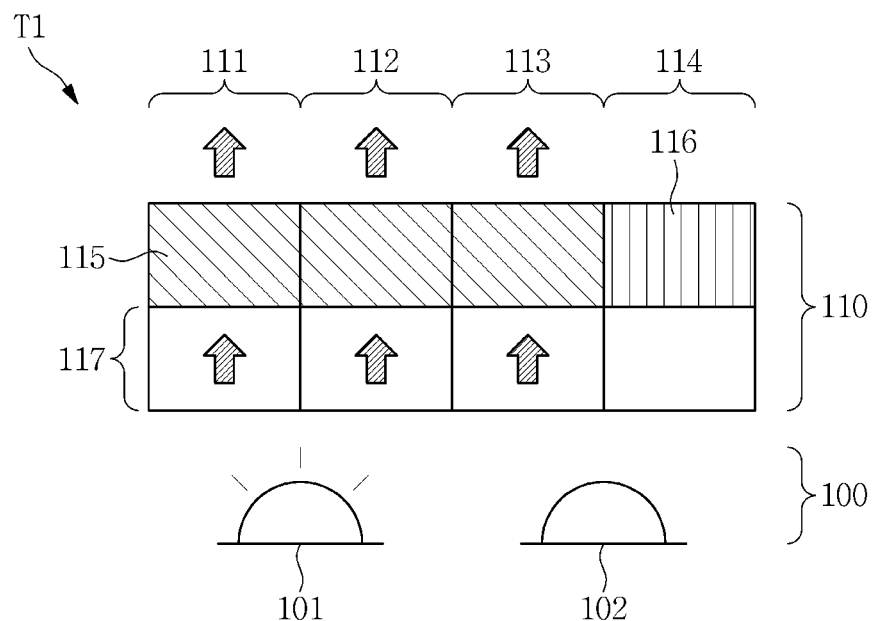
FIG. 3 is a view illustrating an exemplary embodiment of a method of driving a time-division display device according to the invention.
Figure 3:
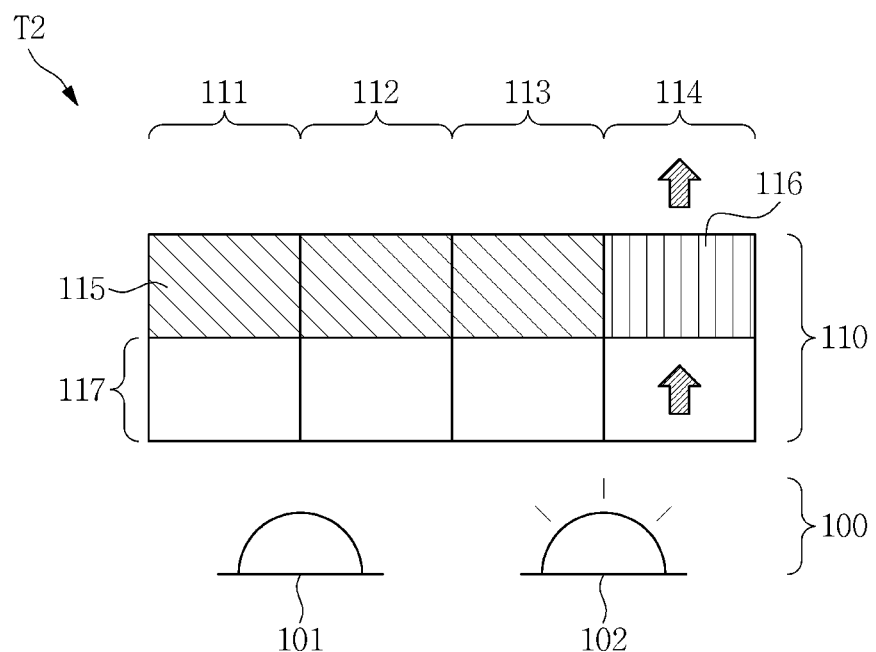

FIG. 3 is a view illustrating a method of driving a time-division display device according to an exemplary embodiment.

Referring to FIGS. 1 and 3, a light control layer 117 may use any material capable of controlling the transmittance of light supplied from a backlight unit 100. In an exemplary embodiment, the light control layer 117 may include at least one of a liquid crystal layer, an electrowetting layer and an electrophoretic layer, for example. Hereinafter, the light control layer 117 will be described as being a liquid crystal layer by way of example.

The light control layer 117 may include a plurality of pixel electrodes (not illustrated) and a plurality of thin film transistors ("TFTs") (not illustrated) electrically connected to the pixel electrodes in one-to-one correspondence. The TFT includes a source electrode connected to a data line, includes a gate electrode connected to a gate line, and includes a drain electrode connected to the pixel electrode. Each TFT functions as a switch of a driving signal supplied to a corresponding pixel electrode. Further, the light control layer 117 may include a common electrode (not illustrated) forming an electric field that controls an arrangement of liquid crystals, along with the pixel electrodes. The light control layer 117 is configured to drive the liquid crystal layer to thereby display an image frontwards.

Light converting units 115 selectively allow light supplied from respective light control layers 117 of first, second and third pixels 111, 112 and 113 to be transmitted. The light converting unit 115 may include a color filter. In an exemplary embodiment, the light converting units 115 may include a color filter transmitting light having a wavelength in a range of about 625 nanometers (nm) to about 740 nm, a color filter transmitting light having a wavelength in a range of about 500 nm to about 565 nm, and a color filter transmitting light having a wavelength in a range of about 440 nm to about 485 nm, respectively, for example.

The light transmitting unit 116 transmits light in an entire wavelength range, the light being supplied from a light control layer 117 of a fourth pixel 114. In an exemplary embodiment, the light transmitting unit 116 may include a light-transmissive transparent material, for example, glass. In an exemplary embodiment, the light transmitting unit 116 may include a transparent electrode material having high thermal conductivity, such as sapphire, zinc oxide, or magnesium oxide.

A display panel 110 includes the first, second, third, and fourth pixels 111, 112, 113, and 114. Each of the first, second, and third pixels 111, 112, and 113 includes the light control layer 117 and the light converting unit 115, and the fourth pixel 114 includes the light control layer 117 and the light transmitting unit 116. The light converting unit 115 and the light transmitting unit 116 may be disposed on or below the light control layer 117.

A frame is divided into predetermined two time periods T1 and T2 (refer to FIG. 6) to perform time-division driving. In a first time period T1, a first light source 101 is turned on and a second light source 102 is turned off. In a second time period T2, the first light source 101 is turned off and the second light source 102 is turned on.

In the first time period T1, TFTs on the light control layers 117 of the first, second and third pixels 111, 112 and 113 are turned on by driving signals received from data lines, respectively. Accordingly, liquid crystals in the light control layers 117 of the first, second and third pixels 111, 112 and 113 are rearranged by an electric field to thereby be operated in a light transmitting mode. A first light that has been transmitted through the light control layers 117 of the first, second and third pixels 111, 112 and 113 is converted into light having a specific wavelength in the respective light converting units 115. A TFT on the light control layer 117 of the fourth pixel 114 is turned off. Accordingly, liquid crystals in the light control layer 117 of the fourth pixel 114 are operated in a light shielding mode. Colors of the light that have been selectively transmitted through the first, second and third pixels 111, 112 and 113 are mixed together to thereby display an image.

In general, white light is obtained by performing time-division on each of light sources of red (R), green (G) and blue (B) colors, thus leading to color breakup. However, in the illustrated exemplary embodiment, white light is obtained through the light converting unit 115 in the first time period T1, whereby color breakup may be prevented.

In the second time period T2, the TFT on the light control layer 117 of the fourth pixel 114 is turned on by a driving signal received from a data line. Accordingly, the liquid crystals in the light control layer 117 of the fourth pixel 114 are rearranged by an electric field to be operated in a light transmitting mode. A second light emitted from the second light source 102 is transmitted through the light control layer 117 of the fourth pixel 114, and the second light having a certain wavelength is uniformly transmitted through the light transmitting unit 116 of the fourth pixel 114. The TFTs on the light control layers 117 of the first, second and third pixels 111, 112 and 113 are turned off. Accordingly, the liquid crystals in the light control layers 117 of the first, second and third pixels 111, 112 and 113 are operated in a light shielding mode. The fourth pixel 114 displays a color of the second light which has been uniformly transmitted through the light transmitting unit 116.

The image displayed in the first time period T1 and the color of the second light displayed in the second time period T2 are simultaneously recognized as an integrated image by human vision, such that a color gamut represented by the display device may be expanded.

Figure 4:
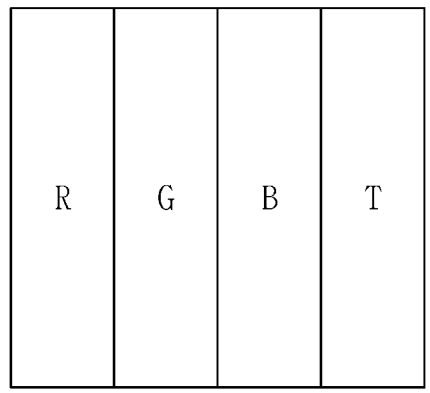
FIG. 4 is a view illustrating an exemplary embodiment of a layout of a color filter of a display device according to the invention.
Figure 4:
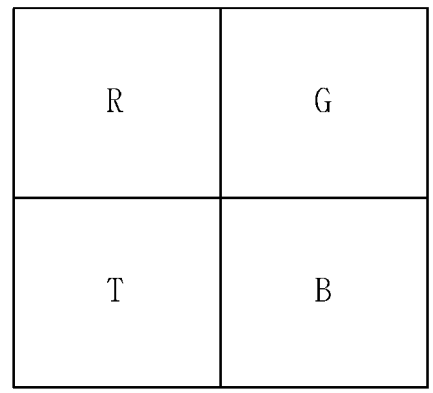

FIG. 4 is a view illustrating a layout of the display panel 110 of the display device according to the exemplary embodiment.

In an exemplary embodiment, referring to FIGS. 3 and 4, the display panel 110 includes the first pixel 111 including a first color filter R transmitting light having a wavelength in a range of about 625 nm to about 740 nm, the second pixel 112 including a second color filter G transmitting light having a wavelength in a range of about 500 nm to about 565 nm, the third pixel 113 including a third color filter B transmitting light having a wavelength in a range of about 440 nm to about 485 nm, and the fourth pixel 114 including a transparent photoresist T, for example.

The first, second and third color filters R, G and B and the transparent photoresist T may be arranged in parallel to one another. While the illustrated exemplary embodiment describes the first, second and third color filters R, G and B and the transparent photoresist T as being sequentially arranged in parallel by way of example, the arrangement of the first, second and third color filters R, G and B and the transparent photoresist T is not limited thereto. In an exemplary embodiment, the first, second and third color filters R, G and B and the transparent photoresist T may be arranged in a rectangular shape, for example. In this case, while the illustrated exemplary embodiment describes the first and second color filters R and G as being arranged in a row and the third color filter B and the transparent photoresist T as being arranged in another row by way of example, the arrangement of the first, second and third color filters R, G and B and the transparent photoresist T is not limited thereto.

Figure 5:
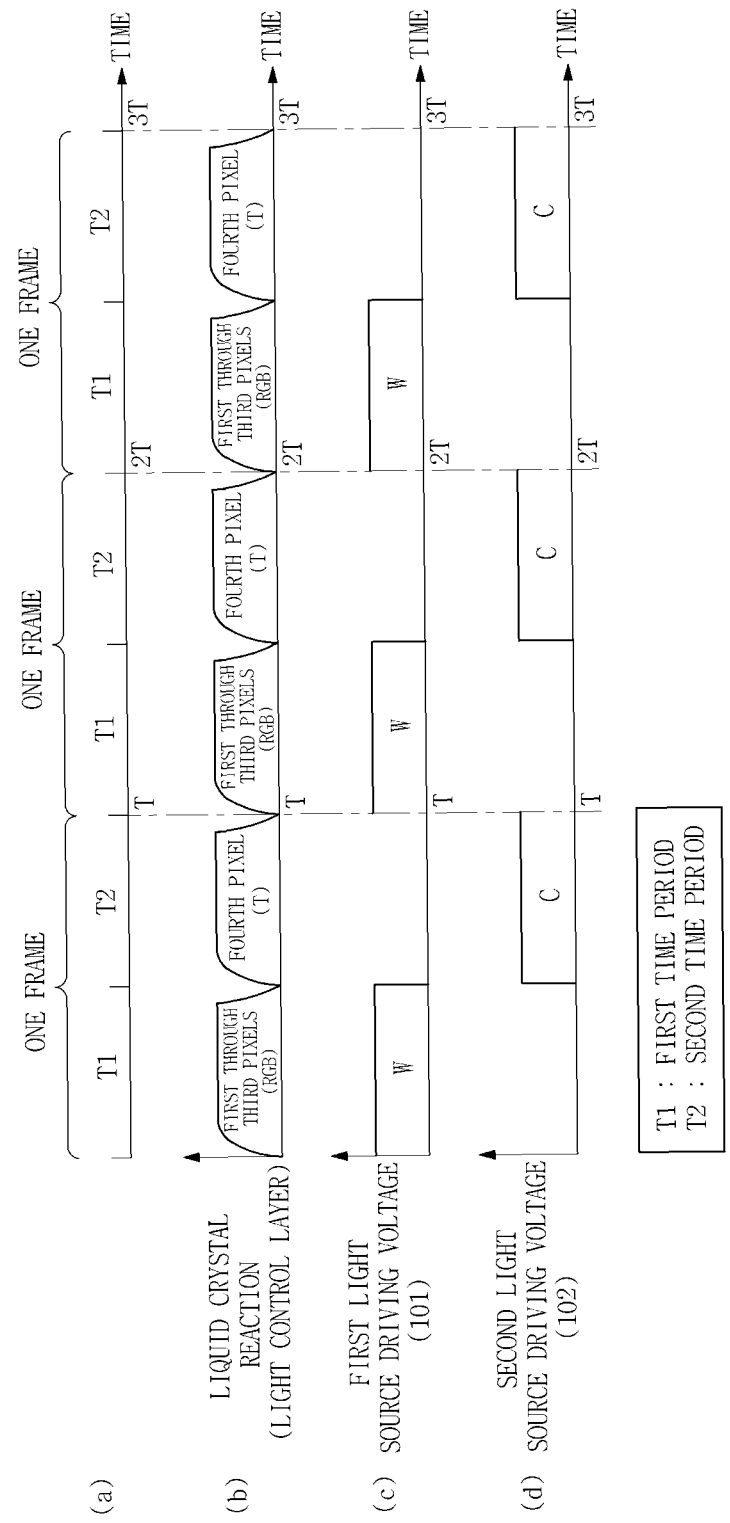
FIG. 5 is a driving timing view illustrating an example of a driving operation of the time-division display device of FIG. 3.

FIG. 5 is a view illustrating an example of liquid crystal reaction of the light control layer 117 and driving timings of the first light source 101 and the second light source 102 of FIG. 3.

In the first time period T1, the first light source 101 receives driving voltages to emit first light, and liquid crystals in the light control layers 117 of the first, second and third pixels 111, 112 and 113 are reacted by an electric field to thereby be operated in a light transmitting mode. Accordingly, the first light may be transmitted through the first, second and third pixels 111, 112 and 113. The second light source 102 is turned off so as not to emit a second light, and liquid crystals in the light control layer 117 of the fourth pixel 114 are operated in a light shielding mode such that light may be blocked by the fourth pixel 114.

Accordingly, the first light emitted from the first light source 101 and transmitted through the light control layers 117 of the first, second and third pixels 111, 112 and 113 are each converted into light having a specific wavelength by the light converting units 115 of the first, second and third pixels 111, 112 and 113, thereby displaying an image.

In the second time period T2, the second light source 102 receives a driving voltage to emit a second light, and liquid crystals in the light control layer 117 of the fourth pixel 114 are reacted by an electric field to thereby be operated in a light transmitting mode. Thus, the second light may be transmitted through the light control layer 117. The first light source 101 is turned off so as not to emit the first light, and the liquid crystals in the light control layers 117 of the first, second and third pixels 111, 112 and 113 are operated in a light shielding mode, such that light from the first, second and third pixels 111, 112 and 113 may be blocked.

Accordingly, in the fourth pixel 114, subsequently to being transmitted through the light control unit 117, the second light having a certain wavelength is transmitted through the light transmitting unit 116 of the fourth pixel 114, such that an image having a color of the second light is displayed.

The image displayed in the first time period T1 and the color of the second light displayed in the second time period T2 are simultaneously recognized as an integrated image by human vision, such that a color gamut represented by the display device may be expanded.

Figure 6:
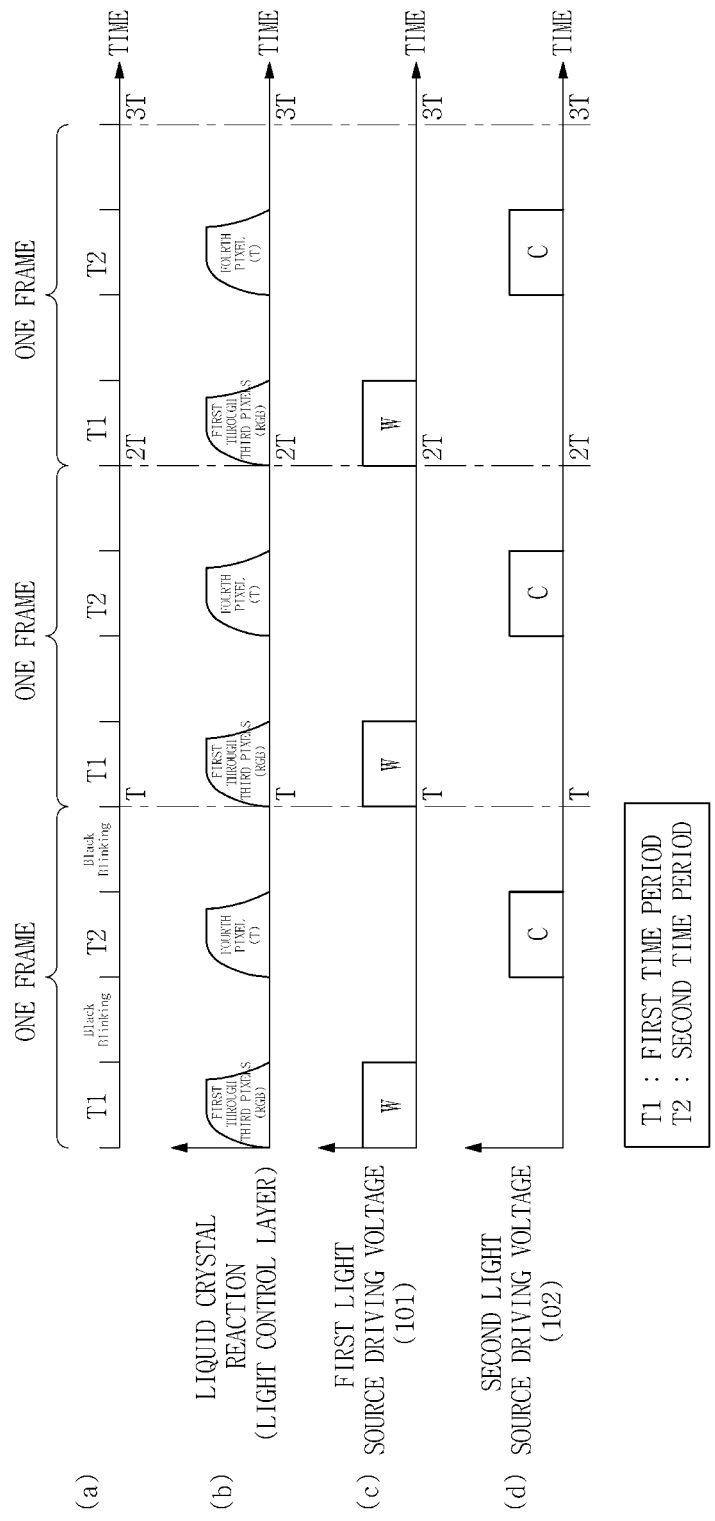
FIG. 6 is a driving timing view illustrating another example of a driving operation of the time-division display device of FIG. 3.

FIG. 6 is a view illustrating another example of liquid crystal reaction of the light control layer 117 and driving timings of the first light source 101 and the second light source 102 of FIG. 3. A description on a driving method in FIG. 6 that is the same as that described in FIG. 5 will be omitted herein for conciseness.

Referring to FIG. 6, a single frame including the first time period T1 and the second time period T2 of FIG. 5 further includes two sets of black blinking period.

The two sets of black blinking period are operated between the first time period T1 and the second time period T2 and between the second time period T2 and the first time period T1, respectively.

The two sets of black blinking period prevent color mixing which is caused by an overlap between an after image displayed prior to time-division driving and an image displayed subsequently thereto.

Subsequent to the first time period T1, in a first black blinking period, liquid crystals in the light control layers 117 of the first, second, third and fourth pixels 111, 112, 113 and 114 are rearranged by an electric field to thereby be operated in a light shielding mode, and the first light source 101 and the second light source 102 are turned off. In the first black blinking period, an after image of the image which is displayed in the first time period T1 is removed.

Subsequent to the second time period T2, in a second black blinking period, the liquid crystals in the light control layers 117 of the first, second, third and fourth pixels 111, 112, 113 and 114 are rearranged by an electric field to thereby be operated in a light shielding mode, and the first light source 101 and the second light source 102 are turned off. In the second black blinking period, a residual light of the second light which is emitted in the second time period T2 is removed.

While FIG. 6 illustrates the example in which the black blinking periods are included in a single frame in order to prevent color mixing, the manner of preventing color mixing is not limited thereto.

Figure 7A:
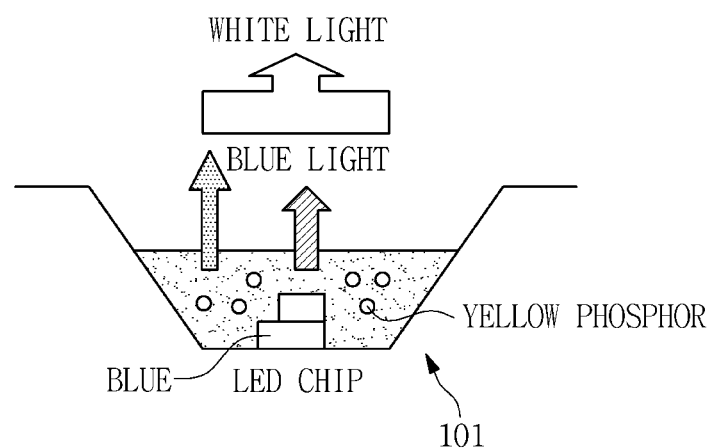
FIGS. 7A, 7B, and 7C are schematic cross-sectional views illustrating an exemplary embodiment of a first light source and a second light source of a display device according to the invention.
Figure 7B:
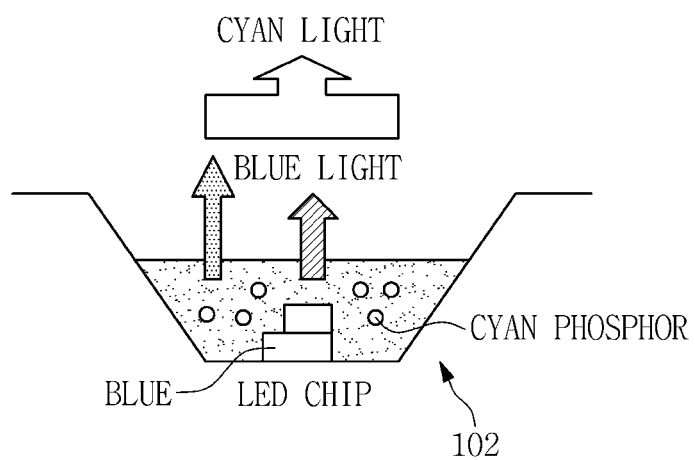
Figure 7C:
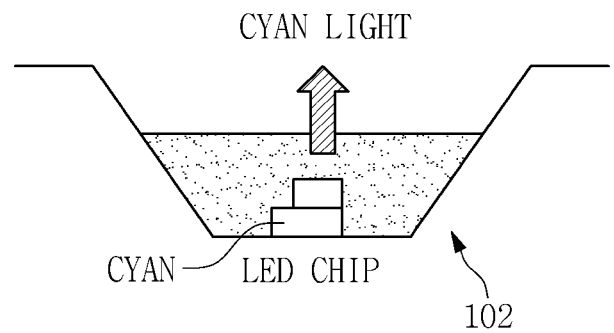

FIGS. 7A, 7B and 7C are schematic cross-sectional views illustrating the first light source 101 and the second light source 102 of the display device according to the exemplary embodiment.

Referring to FIG. 7A, in the illustrated exemplary embodiment, the first light source 101 may emit a first light having a white color. Accordingly, the first light source 101 may emit the first light having a white color, using a yellow phosphor in a blue LED chip.

Referring to FIG. 7B, in the illustrated exemplary embodiment, the second light source 102 may emit a second light having a cyan color, for example. Accordingly, the second light source 102 may emit the second light having a cyan color, using a cyan phosphor in a blue LED chip, for example. Referring to FIG. 7C, in the illustrated exemplary embodiment, the second light source 102 may emit the second light having a cyan color, using a cyan LED chip, for example.

According to exemplary embodiments, the second light source 102 may emit a second light having a yellow color. Accordingly, the second light source 102 may emit the second light having a yellow color, using a yellow phosphor in a blue LED chip, for example. However, the invention is not limited thereto, and the first and second light sources 101 and 102 may represent various other colors by various other combinations.

Figure 8:
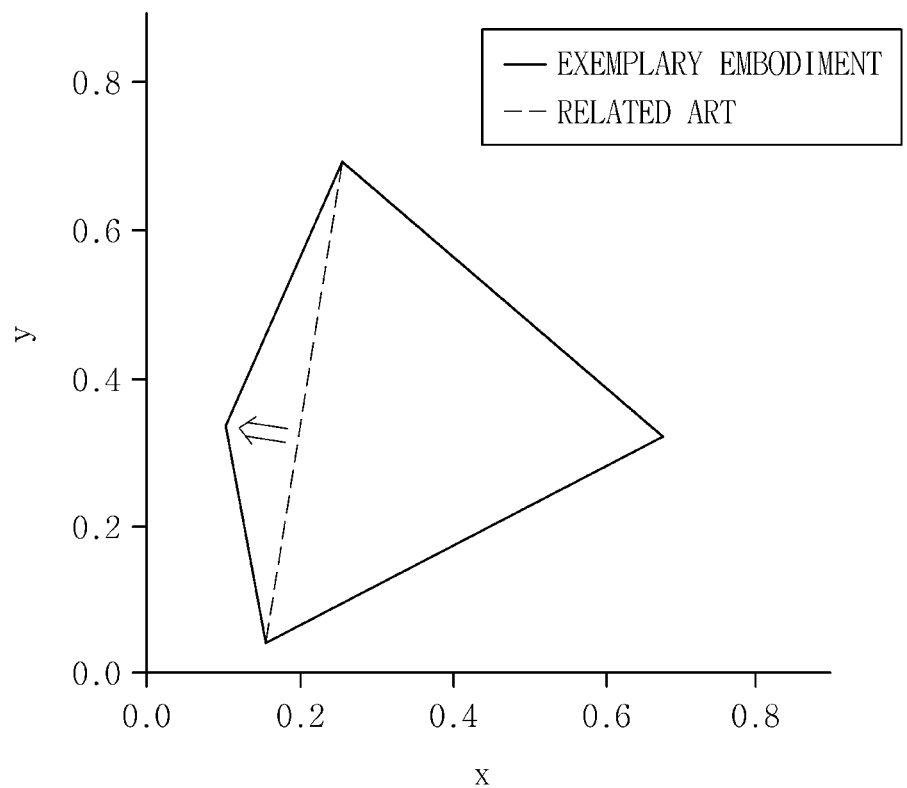
FIG. 8 is a graph illustrating a color gamut represented in the display device of FIGS. 7A, 7B, and 7C.

FIG. 8 is a graph illustrating a color gamut represented in the display device of FIGS. 7A, 7B and 7C.

In the exemplary embodiment with reference to FIGS. 3, 7A, 7B and 7C, the backlight unit 100 includes the first light source 101 emitting the first light having a white color and the second light source 102 emitting the second light having a cyan color, for example. By the time-division driving of the first light source 101 and the second light source 102, the first light transmitted through the light converting unit 115 and the second light through the light transmitting unit 116 are displayed on the display device, and are simultaneously recognized by human vision as an integrated image. Accordingly, an expanded cyan color gamut may be obtained as compared to a related art.

As set forth above, according to one or more exemplary embodiments, the first light is transmitted through the light converting units of the first, second and third pixels in the first time period, and the second light having a different wavelength from that of the first light is transmitted through the light transmitting unit of the fourth pixel in the second time period, and accordingly, a color gamut may be expanded. Irrespective of a cyan color ratio in an image, a light source having a cyan color may be driven invariably. Accordingly, the display device having excellent color reproducibility and high image quality with enhanced color purity may be provided.

From the foregoing, it will be appreciated that various embodiments in accordance with the disclosure have been described herein for purposes of illustration, and that various modifications may be made without departing from the scope and spirit of the teachings. Accordingly, the various embodiments disclosed herein are not intended to be limiting of the true scope and spirit of the teachings. Various features of the above described and other embodiments can be mixed and matched in any manner, to produce further embodiments consistent with the invention.

What is claimed is:

1. A display device comprising:
a display panel comprising a first pixel, a second pixel, a third pixel, and a fourth pixel; and
a backlight unit comprising a first light source which emits a first light and a second light source which emits a second light,
wherein the first, second, third, and fourth pixels comprise respective light control layers,
wherein the first, second, and third pixels comprise respective light converting units which respectively receive the first light from the backlight unit through the light control layers of the first, second, and third pixels, and convert the received first light into light having different wavelengths from one another, and
wherein the fourth pixel comprises a light transmitting unit which receives the second light from the backlight unit through the light control layer of the fourth pixel and transmits the received second light therethrough, and
wherein in a first time period of each predetermined period of a plurality of sequential predetermined time periods, the backlight unit emits the first light, the light control layers of the first, second and third pixels transmit the first light and provide the first light to the light converting units, respectively, and the light control layer of the fourth pixel blocks the first light, and
in a second time period of the each predetermined time period, the backlight unit emits the second light, the light control layer of the fourth pixel transmits the second light to provide the second light to the light transmitting unit, and the light control layers of the first, second and third pixels block the second light.

2. The display device of claim 1, wherein the first light source is turned on and the second light source is turned off in the first time period, and the second light source is turned on and the first light source is turned off in the second time period.

3. The display device of claim 2, wherein the light converting unit comprises:
a first color filter on the first pixel, the first color filter transmitting light having a wavelength in a range of about 625 nanometers to about 740 nanometers;
a second color filter on the second pixel, the second color filter transmitting light having a wavelength in a range of about 500 nanometers to about 565 nanometers; and
a third color filter on the third pixel, the third color filter transmitting light having a wavelength in a range of about 440 nanometers to about 485 nanometers.

4. The display device of claim 3, wherein the backlight unit is disposed below the display panel and further comprises a diffusion plate.

5. The display device of claim 3, wherein the backlight unit further comprises the first and second light sources on a side surface of the display panel, and further comprises a light guide plate below the display panel.

6. The display device of claim 4, wherein the backlight unit emits the first light having a white color.

7. The display device of claim 6, wherein the first light has a peak wavelength in a range of about 440 nanometers to about 485 nanometers.

8. The display device of claim 7, wherein the backlight unit emits the second light having a cyan color.

9. The display device of claim 7, wherein the backlight unit emits the second light having a yellow color.

10. The display device of claim 7, wherein the second light has a peak wavelength in a range of about 485 nanometers to about 500 nanometers.

11. The display device of claim 9, wherein the second light has a peak wavelength in a range of about 565 nanometers to about 590 nanometers.

12. The display device of claim 1, wherein the light transmitting unit comprises a transparent photoresist.

13. A display device comprising:
a display panel comprising a first pixel, a second pixel, a third pixel, and a fourth pixel; and
a backlight unit comprising a first light source which emits a first light and a second light source which emits a second light,
wherein the first, second, third, and fourth pixels comprise respective light control layers,
wherein the first, second, and third pixels comprise respective light converting units which respectively receive the first light from the backlight unit through the light control layers of the first, second, and third pixels, and convert the received first light into light having different wavelengths from one another, and
wherein the fourth pixel comprises a light transmitting unit which receives the second light from the backlight unit through the light control layer of the fourth pixel and transmits the received second light therethrough, the second light is a color other than white light, blue light, red light or green light, and
wherein in a first time period of each predetermined period of a plurality of sequential predetermined time periods, the backlight unit emits the first light, the light control layers of the first, second and third pixels transmit the first light and provide the first light to the light converting units, respectively, and the light control layer of the fourth pixel blocks the first light, and
in a second time period of the each predetermined time period, the backlight unit emits the second light, the light control layer of the fourth pixel transmits the second light to provide the second light to the light transmitting unit, and the light control layers of the first, second and third pixels block the second light.

14. The display device of claim 13, wherein the backlight unit emits the second light having a cyan color.

15. The display device of claim 14, wherein the second light has a peak wavelength in a range of about 485 nanometers to about 500 nanometers.

16. The display device of claim 13, wherein the backlight unit emits the second light having a yellow color.

17. The display device of claim 16, wherein the second light has a peak wavelength in a range of about 565 nanometers to about 590 nanometers.

18. The display device of claim 13, wherein the light transmitting unit comprises a transparent photoresist.

* * * * *